United States Patent
Jeskey et al.

(10) Patent No.: US 6,820,752 B2
(45) Date of Patent: Nov. 23, 2004

(54) FOLDABLE TRANSPORT RACK AND METHODS OF USE THEREOF

(75) Inventors: Marion Michael Jeskey, Northfield, MN (US); Michael Jeffery Wade, Northfield, MN (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 10/754,986

(22) Filed: Jan. 9, 2004

(65) Prior Publication Data

US 2004/0140275 A1 Jul. 22, 2004

Related U.S. Application Data

(63) Continuation of application No. 10/126,434, filed on Apr. 19, 2002, now abandoned.

(51) Int. Cl.[7] ................................................. A47F 7/00
(52) U.S. Cl. ..................... 211/41.14; 211/195; 206/454
(58) Field of Search ............................. 211/41.14, 195; 211/194; 206/454

(56) References Cited

U.S. PATENT DOCUMENTS

| | | | |
|---|---|---|---|
| 1,745,959 A | 2/1930 | Steiner | |
| 1,836,362 A | 4/1931 | Crowley | |
| 2,884,136 A | 4/1959 | Leighton | |
| 3,095,987 A | 7/1963 | Sable | |
| 3,193,093 A | 7/1965 | Hansen | |
| 3,402,845 A | 9/1968 | Eriksson | |
| 3,669,292 A | 6/1972 | Tuura | |
| 3,857,494 A | 12/1974 | Giardini | |
| 3,878,942 A | 4/1975 | Hansen et al. | |
| 3,887,071 A | 6/1975 | Thomaswick | |
| 3,913,965 A | 10/1975 | Muller et al. | |
| 3,955,676 A | 5/1976 | Hansen et al. | |
| 3,979,864 A | 9/1976 | Tillie | |
| 4,177,907 A | 12/1979 | Funaioli et al. | |
| 4,258,631 A | 3/1981 | Brown | |
| 4,278,171 A | 7/1981 | Millhoan | |
| 4,467,922 A | 8/1984 | Rowley | |
| 4,512,473 A | 4/1985 | Thomaswick et al. | |
| 4,836,379 A | 6/1989 | Shaw | |
| 4,934,538 A | 6/1990 | Beyer | |
| 5,012,879 A | 5/1991 | Bienek et al. | |
| 5,085,329 A | 2/1992 | Crowell et al. | |
| 5,145,073 A | 9/1992 | Kitagawa et al. | |
| 5,411,360 A | 5/1995 | Hilliker et al. | |
| 5,448,805 A | 9/1995 | Allen et al. | |
| 5,676,066 A | 10/1997 | Cavalier et al. | |
| 5,685,437 A | 11/1997 | Lisec | |
| 5,803,257 A | 9/1998 | Bartholomew | |
| 5,813,536 A | 9/1998 | Bartholomew | |
| 6,102,206 A | 8/2000 | Pride | |

FOREIGN PATENT DOCUMENTS

| | | |
|---|---|---|
| CA | 759311 | 5/1967 |
| DE | 2 400 559 | 1/1974 |
| DE | 24 50 906 | 11/1980 |
| DE | 3442 992 A1 | 11/1984 |
| EP | 0423 503 A1 | 9/1990 |
| FR | 1532545 | 5/1967 |
| GB | 2 024 167 A | 3/1978 |
| GB | 2 334 943 | 9/1999 |
| SU | 1558-729 A | 4/1990 |

*Primary Examiner*—Robert W. Gibson, Jr.
(74) *Attorney, Agent, or Firm*—Fredrickson & Byron PA

(57) ABSTRACT

A stackable, folding transport rack generally including a base, a plurality of supports, at least one foldable A-frame hingedly secured to the base and an optional securing assembly. The base of the transport rack is supported by a plurality of legs bearing supports which are adapted to support the lower edges of objects, such as glass sheets or other sheet materials to be carried by the transport rack. The supports are configured to be as low as possible to the resting surface of the transport rack so as to provide for a minimal lift height for loading and unloading. The low arrangement of the supports also maximizes the size of glass sheets that can be carried and maintains the lowest possible center of gravity. The top of the sheet supports may be cushioned with appropriate resilient material.

24 Claims, 7 Drawing Sheets

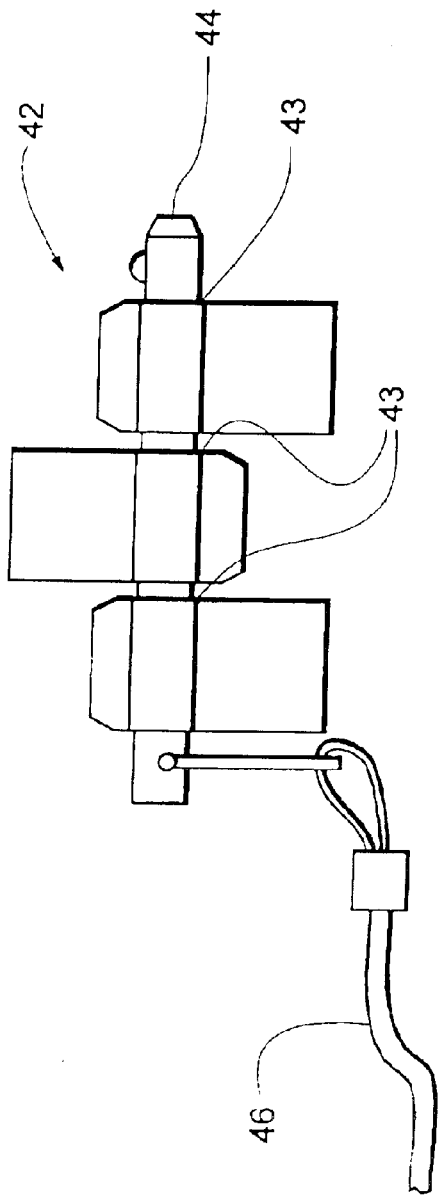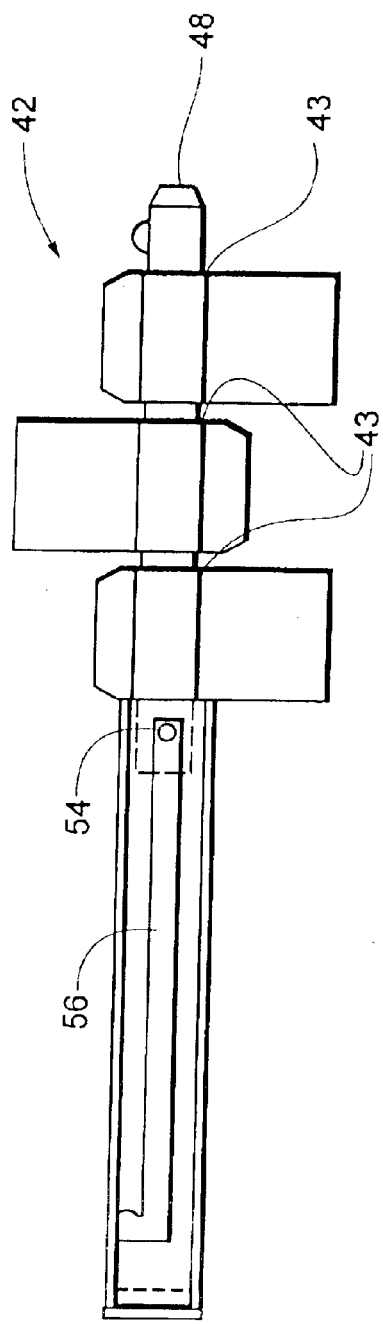

FOLDABLE TRANSPORT RACK AND METHODS OF USE THEREOF

This application is a continuation of U.S. patent application Ser. No. 10/126,434, filed Apr. 19, 2004, now abandoned.

FIELD OF THE INVENTION

The present invention relates to A-frame for supporting objects, such as glass sheets or other sheet materials, during transport and storage. More particularly, the present invention relates to a foldable, stackable, transportable, A-frame rack with a low center of gravity and improved load securing assembly for storing and transporting materials, such as glass sheets or other sheet materials.

BACKGROUND OF THE INVENTION

A-frame structures have long been used to support sheet materials standing on edge. Sheet materials may include construction materials, such as plywood, plaster board or paneling, as well as sheets of glass.

Glass panes, in particular, may be stored in this fashion. Glass is often made in large sheets which are heavy and breakable. Because of glass's weight and breakability, stability and protection of the sheet material while in storage and transit are especially important.

Various techniques are commonly employed for the storage and shipping of glass sheets. Harp or slot racks, for example, may be employed to store individual sheets of material, such as glass. A slot rack consists of a series of vertical partitions between which sheets of glass may be placed on edge for convenient storage. A harp rack is similar to a slot rack except that it employs tensioned vertical cables or wires to separate the individual sheets of material, such as glass. Harp or slot racks are convenient for storing small quantities of glass but require individual handling of each sheet and are not particularly appropriate for transporting glass to another location. Furthermore, these types of racks are not readily adaptable to automated transport devices for moving sheets of material from one location to another.

A further option for the transport and storage of objects, such as sheet of glass or other sheet materials, is the use of A-frame racks. An A-frame rack generally includes two or more A-frames, which take the form of a tall, often truncated, isosceles triangle. The A-frame rack further includes a support at the base upon which glass sheets may be stood on edge and then leaned against the A-frame rack for support. A-frame racks are convenient for stationary storage purposes because once the sheets of glass are in place, they are held by gravity and well protected from falling. Straps or other securing mechanisms are used to hold glass panes when A-frame racks are transported In the float glass manufacturing process, molten glass is commonly floated in long ribbons, which are cooled and then cut to size and stored until they are ready for the next step in a manufacturing process or for shipping. The cut sheets of glass are commonly loaded one at a time onto one side of an A-frame rack. When one side of the rack is full, the rack is pivoted through 180 degrees to make available the second side for loading. While the second side is loading, the glass on the first side is packaged as desired and moved by means of a crane onto a support for storage until needed.

Thereafter, the glass is unloaded from the A-frame support and loaded onto a truck or other delivery transport, using one of several transportable glass supports, as, for example, another A-frame support. At the delivery location (for example, a manufacturing line for applying a coating to the glass), the glass is again unloaded and positioned so as to be used. The resulting glass is then again loaded onto a support and is moved to, for example, a station where the glass panes are converted into insulating glass ("IG") units, the glass again being unloaded and reloaded. Finally, the IG units are transported to a plant where they are unloaded and converted into framed windows. Thus, the glass may be repeatedly loaded and unloaded, leading to substantial expense and risk of damage.

A variety of A-frame rack designs already exist that are intended for use in the storage of glass as well as the shipping of glass sheets. When used for shipping, it is common for A-frame racks to be fashioned as reusable structures that are shipped loaded with glass sheets and returned empty. In an effort to minimize shipping costs on the return trip, certain A-frame configurations have been proposed that are intended to be disassembled or collapsed when empty to minimize shipping bulk.

For example, U.S. Pat. No. 3,878,942 issued to Hansen et al., discloses an A-frame structure that is secured to the floor of the transport vehicle such as a railroad car or a truck. The Hansen A-frame must be secured to the floor prior to loading. Once unloaded, the A-frame may be released from the floor and folded from side to side to a smaller configuration in an accordion-like fashion. The Hansen A-frame may not be transported when loaded, as it is secured to the floor before loading. It is rather complex, and would require several individuals to accomplish its folding and unfolding.

Another A-frame structure is revealed in U.S. Pat. No. 5,085,329 issued to Crowell et al. The A-frame disclosed in Crowell is intended for the temporary storage of 4 foot by 8 foot sheet construction materials such as plywood, paneling or particle board which, of course, are substantially lighter in weight than glass sheets. In addition, the Crowell A-frame is disassembled for transportation and is not transportable when loaded.

U.S. Pat. No. 5,411,360 issued to Hilliker et al., discloses a collapsible, stackable A-frame rack intended for transporting large glass sheets. The Hilliker A-frame includes three A-frame stanchions which may be removed from the A-frame base after the A-frame is unloaded. The A-frame stanchions may then be nested on top of the base in a horizontal orientation which allows for the A-frame assembly to be stacked for return transport. An additional aspect of the Hilliker A-frame structure is that the structure is adapted to be transported on a dolly jack which, when positioned beneath the A-frame rack, may lift the A-frame rack. The A-Frame rack and dolly may then be transported by towing. The structure of the Hilliker device causes the lower edges of the glass sheets to be carried a substantial height above the floor. This requires that glass sheets be lifted to a relatively great height for loading and unloading upon the Hilliker A-frame and limits the size of panes that can be loaded under a given ceiling height. Loading of glass from the end of a float glass production line accordingly would be relatively difficult. The collapsed Hilliker A-frame rack includes a multitude of loose parts that must be kept together for return transit and which may be prone to loss.

Another aspect of transporting glass sheets is that of securing the glass during transport to prevent the glass panes from shifting with respect to each other with consequent breakage. A variety of approaches have been taken including the use of wedges, brackets, and straps to restrain the glass sheets during transit.

Strapping is probably the most commonly employed approach to securing glass sheets during transit. Strapping is typically stretched over the material to be restrained and then tensioned by a ratcheting mechanism. A number of currently existing strapping schemes exist which may allow adjustment of the location of one end of the strap by sliding it along a channel. For example, U.S. Pat. No. 5,448,805 (Allen et al.), discloses a strapping mechanism for use with a roof top carrier. One end of the strapping mechanism may be slid along a channel to various locations to compensate for the width of the load.

Another strapping mechanism is disclosed in U.S. Pat. No. 4,278,171 (Millhoan). This patent discloses a sliding strap retainer and compression block. The compression block includes a pair of spaced plates that are mountable at the base of an A-frame rack. The plates each have a pair of holes for selectively positioning the block on the base by aligning the holes of each plate with a hole in each base of the frame while biasing the block against the sheets of glass. Thereafter, a strap is secured at one end to the block and at the other end to the top of the A-frame. The strap is tightened drawing the block toward the sheets of glass. The Millhoan device requires the manual positioning of the compression block on the A-frame in order to secure the sheets of glass. Further, the Millhoan device does not allow the straps retaining the glass sheets to lie flat against the surface of the sheet of glass increasing stress at the edges of the glass sheet.

It would be preferable to have an A-frame rack for storing and transporting glass sheets which has the lowest possible center of gravity and a low lift height for loading and unloading. In addition, it would be preferable that such an A-frame structure be readily transportable with a low dolly jack apparatus. Further, it would be desirable for an A-frame structure to be reduceable to a compact empty shipping size by one worker, preferably without the need for tools. Further, it would be helpful if the compacted A-frames were stackable for return shipping. Moreover, it would be a benefit if the A-frame structure would have a self-tightening, self-adjusting restraining mechanism for securing the glass sheets in place for shipping. Finally, it would be desirable to provide an A-frame rack useful in transporting glass sheets from a glass float line to a subsequent manufacturing line with requiring an intermediate unloading step.

SUMMARY OF THE INVENTION

The present invention in large part solves the problems referred to above by providing a unitized, foldable transport rack for retaining and securing panels, such as sheets of glass. The transport rack of the present invention in its preferred embodiment has no loose parts and is foldable and unfoldable by a single individual. The foldable transport rack has a low center of gravity and a low lift height to ease loading and unloading and to maximize the size of glass sheets that can be transported. In addition, the foldable transport rack of the present invention is transportable by a low dollyjack and includes self-adjusting securing straps which urge the bottom of the carried objects against the A-frame assembly to provide for secure transportation of large objects, such as glass sheets.

The transport rack generally includes a base, a plurality of supports for supporting panel edges, at least one foldable A-frame, and optionally a securing assembly. In one embodiment, the base of the transport rack is supported by a plurality of legs including the supports, the latter being adapted to handle and retain the lower edges of glass sheets or other objects to be carried by the transport assembly. The legs engage a horizontal surface, commonly a concrete floor, upon which the transporting rack rests. The supports are configured to be as low as possible to the ground so as to provide for a minimal lift height for loading and unloading. More specifically, the low arrangement of the supports provides for the loading of the transport rack directly from an automated manufacturing assembly. Furthermore, this arrangement also maximizes the size of objects that can be carried and maintains the lowest possible center of gravity. It is noted that the upper surface of the supports may be optionally cushioned with appropriate resilient material to provide additional protection to and retention of the materials loaded upon the transport racks.

The base of the transport rack may also define a corridor into which a low dolly jack may be received. The low dolly includes a plurality of lifting jacks by which the transport rack may be lifted from the ground, supported on the dolly and towed by an appropriate vehicle such as a forklift or tractor. The base also supports at least one and preferably three foldable A-frames. The A-frames are configured to be foldable parallel to the base for compact storage when it is desired to transport the empty transport rack back to its point of origin for reuse.

In one embodiment of the present invention, the outer two A-frames may be configured to be hinged near the base so that the outer two A-frames fold toward the center of the transport rack and lay one on top of the other. If a third or further A-frame is employed, it may be configured to fold at multiple locations, such as two locations, one near the base and the other in the mid-section of the A-frame. This allows the interior A-frame or A-frames to fold such that the outer A-frames may fold on top of the interior A-frames without interfering with one another and still allow all A-frame components to remain within and proximate to the base.

Also in an embodiment of the invention, the A-frames, when standing upright, are secured by a series of locking blocks which are on the opposite side of the frame from an associated hinge. The locking blocks each define a bore through which a pin may be passed to lock the A-frame in an upright position. The locking pins in such an embodiment may be secured to the transport rack by a lanyard or may be integrally attached to one of the locking blocks such that the pin is spring biased and may be latched in an open position or biased by the spring to a position passing through the bores to lock the hinged joint in an upright position.

Embodiments of the transport rack further comprise a securing mechanism that includes straps, which pass from the top of each A-frame down over the load to be secured and are then secured at the support. The support includes a traveler to which the straps may be secured. The traveler slides in a slot. The slot is ramped upwardly and inwardly toward each A-frame so that applying tension to the strap tends to urge the strap inwardly toward the objects to be secured. The tensioning of the strap can be accomplished with a conventional ratcheting buckle or other appropriate means.

In yet another embodiment, the invention provides a method for storing and transporting panel-like objects such as glass sheets while avoiding the problems encountered in repeatedly loading and unloading stacks of panels from a rack. A rack is provided, comprising a base, at least one support proximate a floor on which the rack rests, the support extending outwardly away from the base, and at least one A-frame member hingedly attached to the base, the A-frame member being foldable from a generally upright orientation to a generally horizontal orientation while remaining attached to the base. At a first location, panel-like objects are loaded one at a time onto the support, the objects being positioned parallel to each other to form a stack that leans against said A-frame member. Without removing the panels in stack form from the rack, the rack is transported to one or more different locations ending at a final location, and at that location, the panels are unloaded one at a time from the rack. In the case of glass sheets, the first location may be adjacent a float glass manufacturing line to receive glass sheets one at a time from the float glass line. The final location may be at a glass sheet coating line, where the glass sheets are unloaded one at a time to undergo a coating process.

BRIEF DESCRIPTION OF THE DRAWINGS

FIG. 5a depicts details of fastener block as used in accordance with the present invention;

FIG. 5b depicts an alternative embodiment of the fastener block;

DETAILED DESCRIPTION OF THE INVENTION

Figure 1:
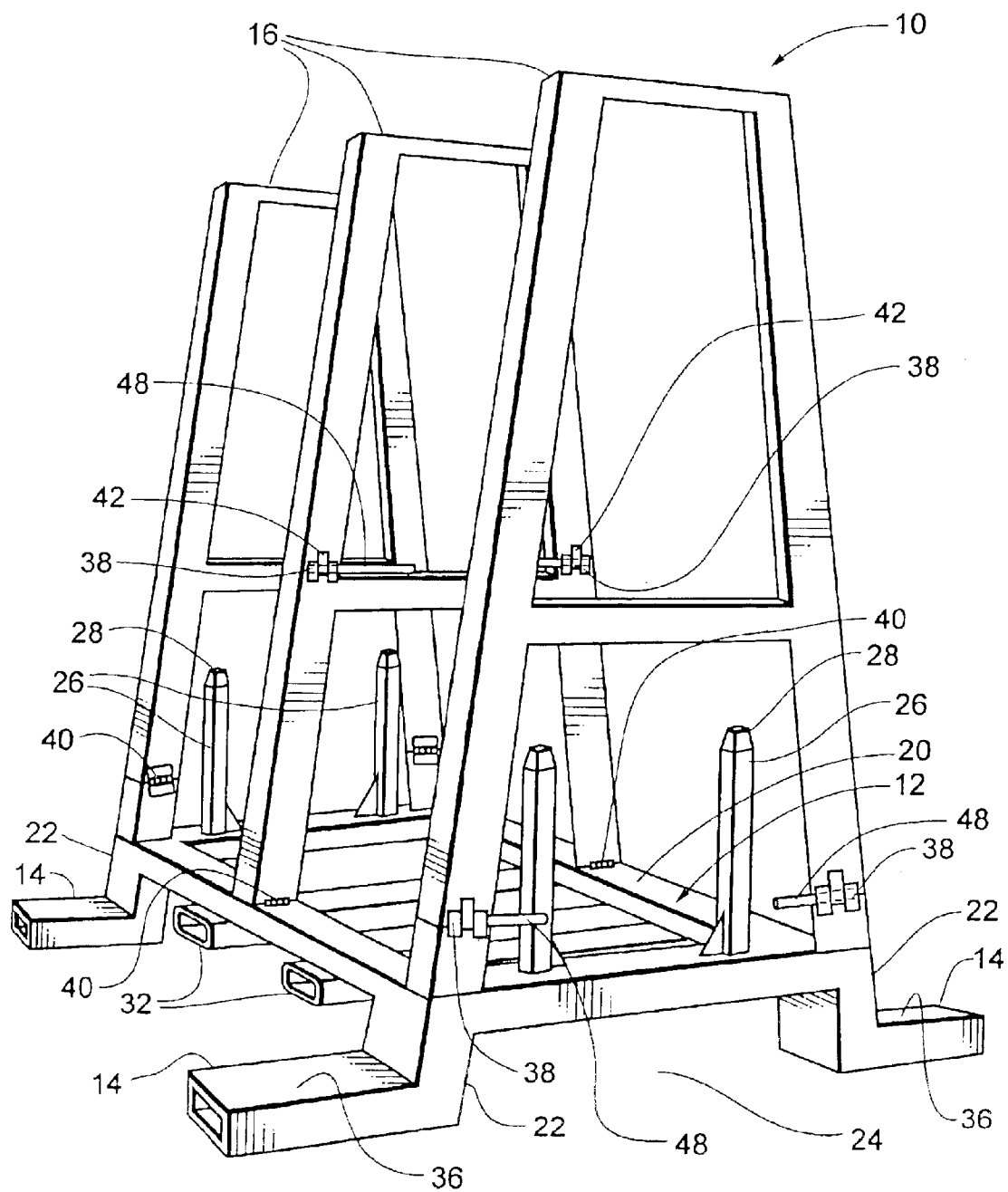
FIG. 1 is a perspective view of a folding transport rack in accordance with the present invention.

In accordance with the present invention, various embodiments of a folding transport rack 10 generally comprise a base 12, at least one object support 14, at least one folding A-frame 16, and an optional load securing assembly 18.

Figure 2:
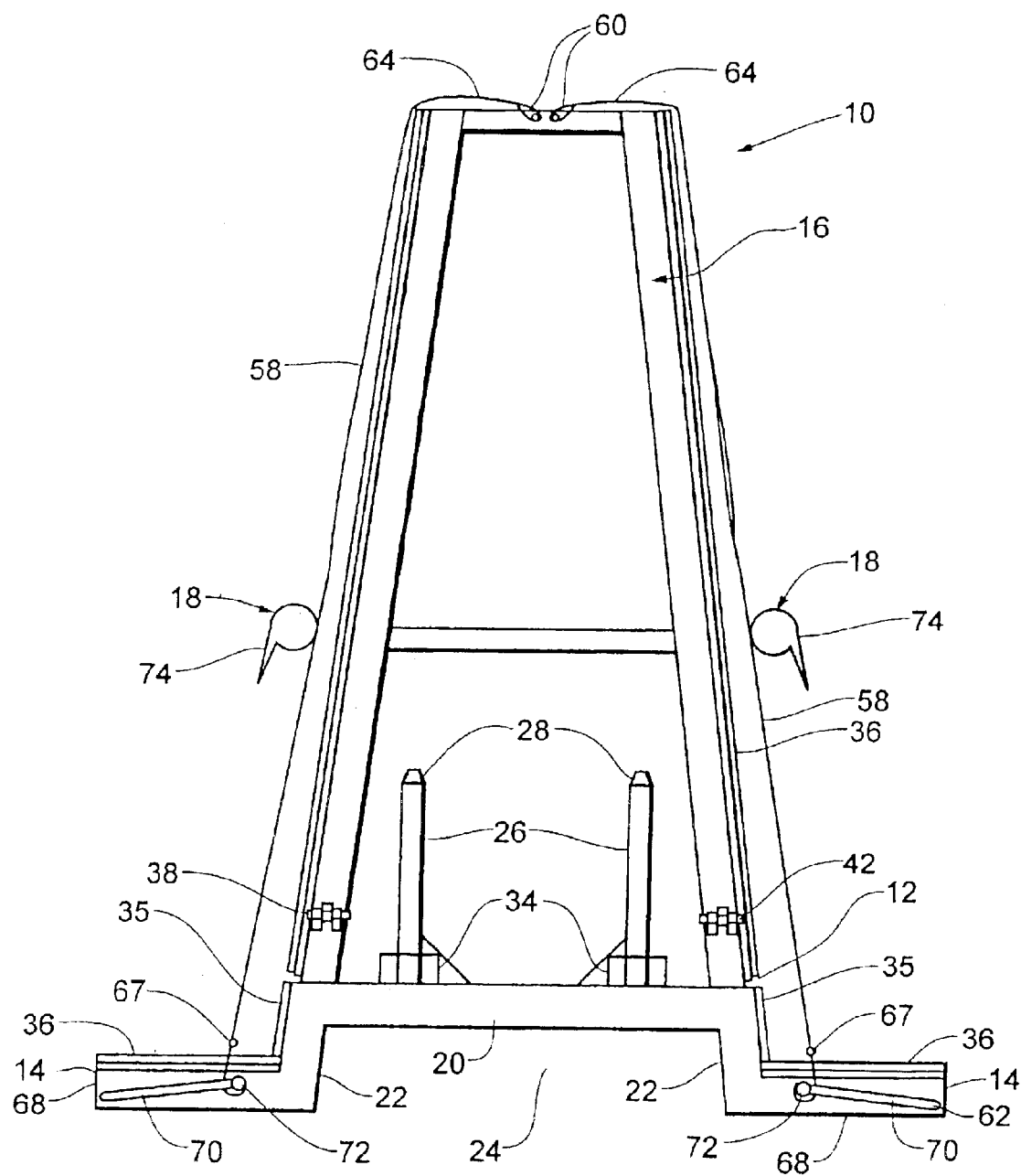
FIG. 2 is an end elevational view of the transport rack.

FIGS. 1 and 2 depict an embodiment of the transport rack of the present invention, which comprises a base 12, multiple supports 14, multiple folding A-frames 16, and a load securing assembly 18.

The base 12 includes platform 20 and ground engaging legs 22. Generally the platform 20 is a horizontal frame that, along with the rest of the glass transport rack 10, is constructed of welded, rectangular steel tubing, although other materials may be used. The materials are of appropriate strength to accommodate the size and weight of the objects to be loaded. Platform 20 and legs 22 that extend downwardly from the platform, define between them a corridor 24 beneath the platform.

The transport rack may also optionally include stacking assemblies 25 that in one embodiment is positioned on the base 12. The stacking assemblies 25 may take the form of platform 20 and legs 22 being configured in the manner of stackable trays wherein legs 22 settle into indentations (not shown) in platform 20. Other nesting approaches will be apparent to those skilled in the art.

Figure 3:
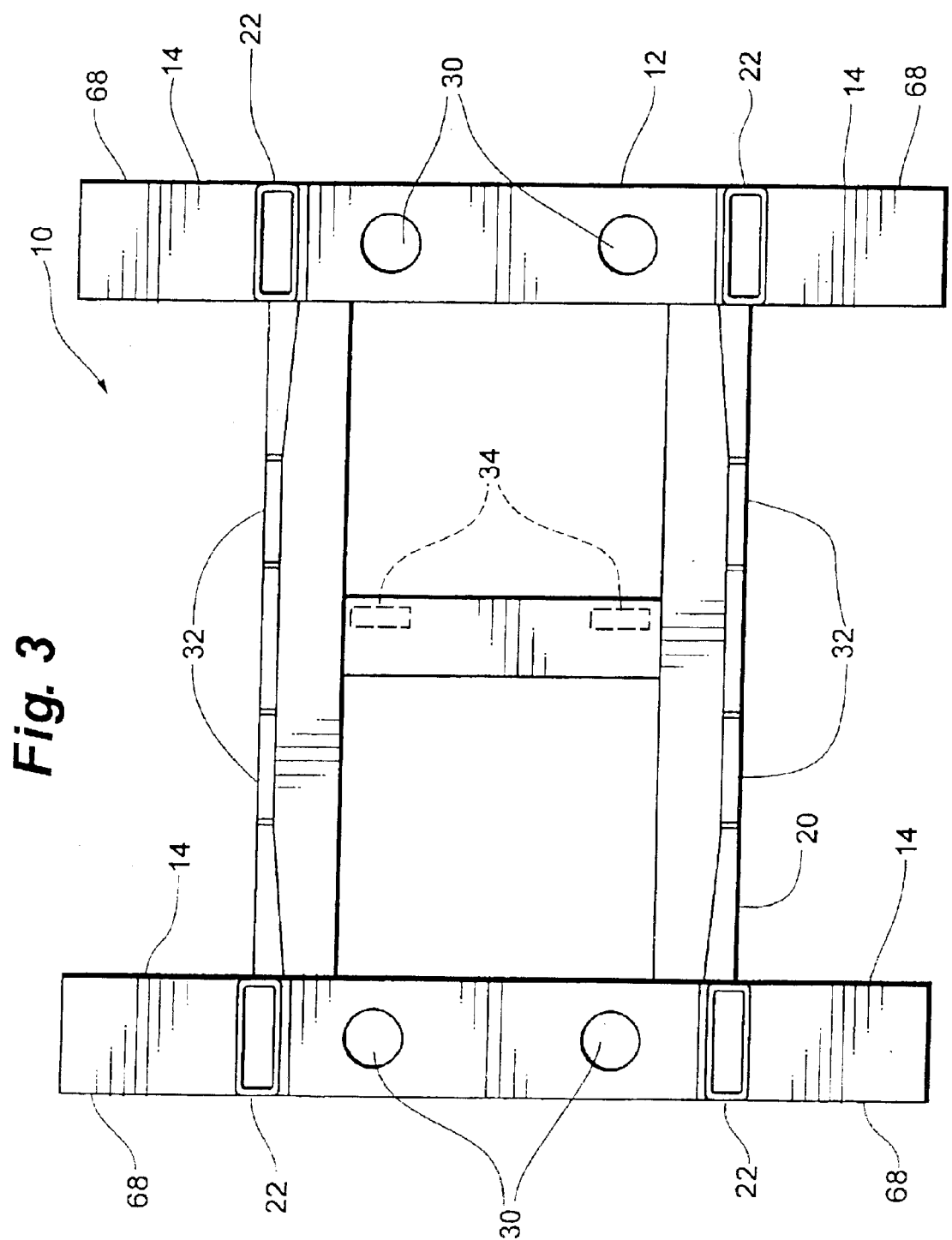
FIG. 3 is a bottom plan view of the transport rack.
Figure 4:
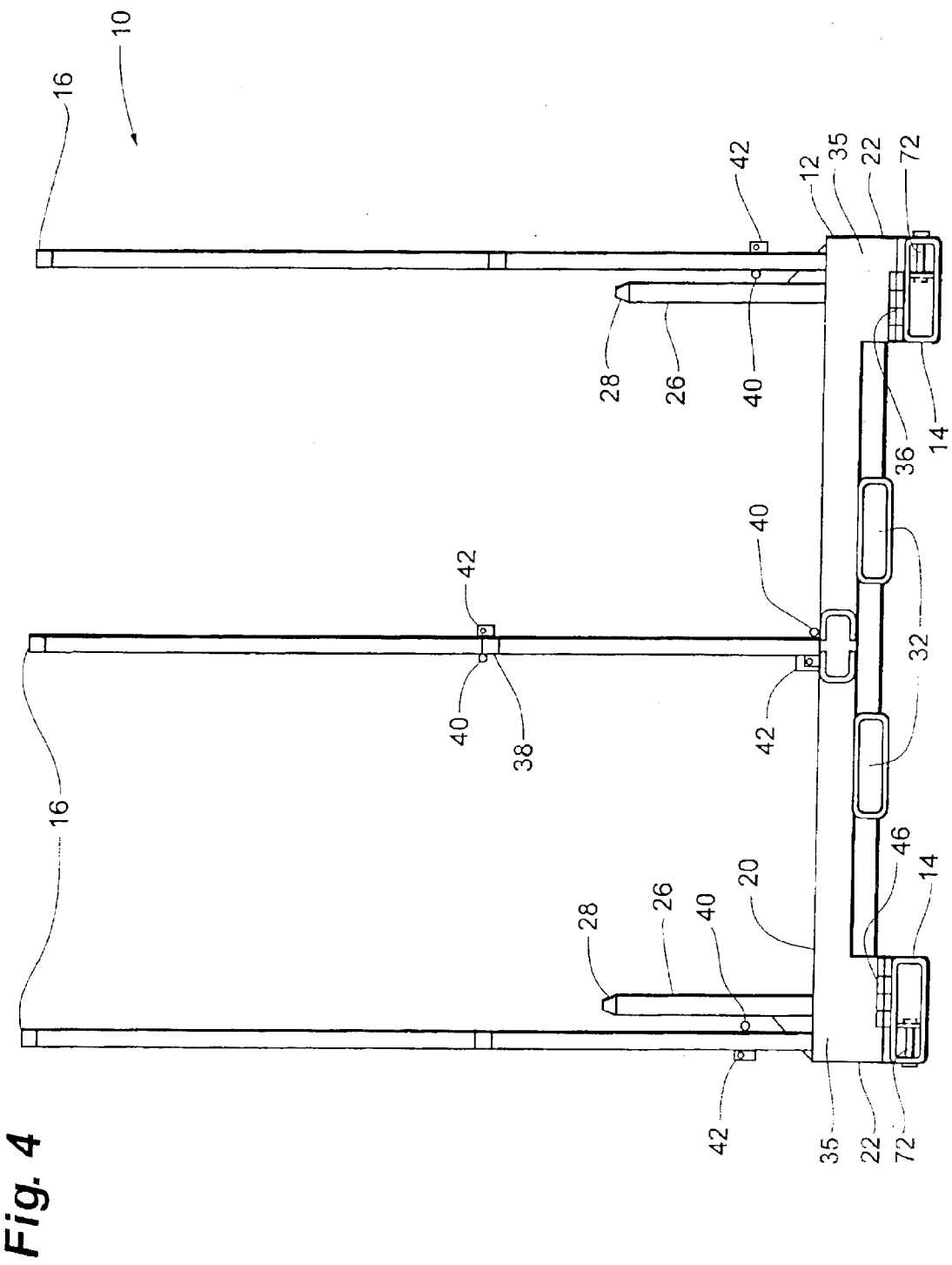
FIG. 4 is a front elevational view of the transport rack.

In the present embodiment depicted in FIGS. 1–3, the base 12 includes stacking posts 26, crowned by stacking caps 28. As best seen in FIG. 3, stacking pockets 30 may be defined in the bottom side of platform 20 and are configured to receive the stacking posts 26. Base 12 may further include a plurality of forklift pockets 32 below and A-frame rests 34 on top secured thereto.

In one embodiment of the invention, legs 22 may include a non-scratching sheet 35 on their outer surface that comes into contact with the glass sheets or other panels. Sheet 35 may be made of nylon or other non-scratching material, that is, material that will not scratch the glass or other panels as they are loaded, carried, and unloaded from the rack.

In a first embodiment, supports 14 are rigidly attached to legs 22 such as by welding bolts, rivets, clamps, or any other attachment means. The supports 14 are positioned as low as possible on legs 22 extending horizontally outward from base 12. It is noted that the legs 22, with joined supports 14, may be fixed, but could also be adjustable for movement along the platform 20 to accommodate different sized and shaped objects.

In another embodiment, the supports 14 may be attached directly to the platform. It is also noted that the supports, whether joined to legs or the platform, may be permanently secured to the transport rack or may be adjustable. Adjustable supports may be moved along the sides of the base and subsequently secured in a position of optimum support to the objects loaded in accordance with the size and shape of the object.

The tops of supports 14 (normally less than 12 inches from the ground) are preferably six inches or less from the ground. However, the most preferable position is approximately three inches from the ground. Sheet supports 14 are oriented generally parallel to the ground; that is, generally horizontally. However, other embodiments of the invention may include supports 14 that are turned upward at an angle. The angling of the supports 14 may contribute to the retention of the materials to the A-frame of the transport rack. Furthermore, the material supports may also include a support cushioning 36 on the top surface thereof. Cushioning 36 is of a resilient material such as 85 durometer Neoprene™ or Santoprene™, or other similar cushioning material may be utilized.

Figure 6:
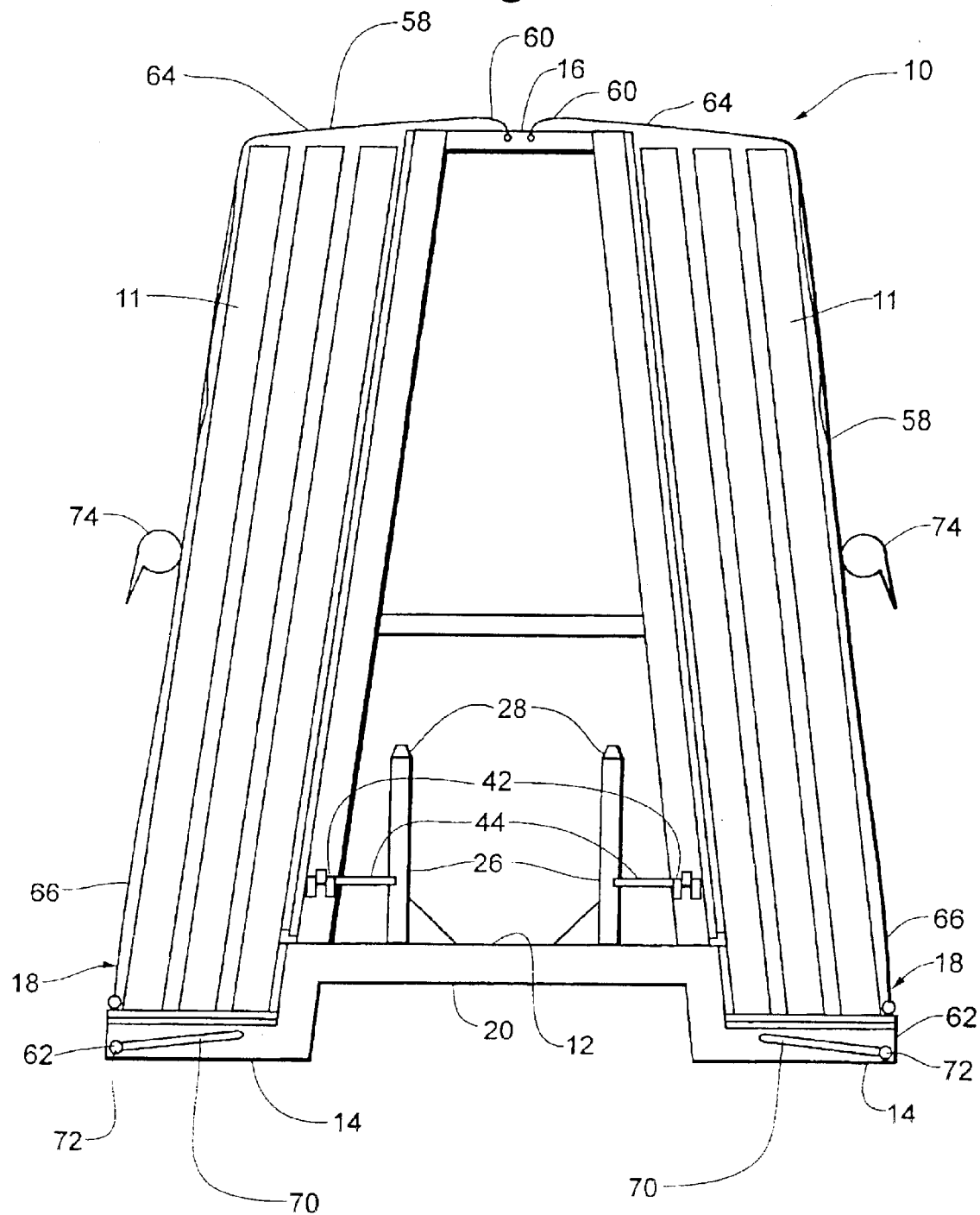
FIG. 6 is an end elevational view of the transport rack of the present invention with a load in place.

Referring particularly to FIGS. 1, 2, and 6, folding A-frames 16 extend upwardly from platform 20 in a generally vertical orientation. It will be apparent to those skilled in the art that any number of folding A-frames 16 may be employed depending upon size and load requirements. Folding A-frames 16 are sectioned at joints 38. Joints 38 are connected by hinges 40 and opposed latch or fastener block assembly 42 defining bores 43 therethrough.

Referring to FIG. 5a, in a first embodiment, fastener block assembly 42 is secured by a conventional spring pin 44 which may be retained against loss by a lanyard 46. Spring pin 44 passes through bore 45.

Referring to FIG. 5b, in another embodiment, a spring biased pin 48 may be slidably carried in a sleeve 50 secured to fastener block assembly 42. Spring biased pin 48 further includes retractor handle 54 which travels in slot 56. Spring biased pin 48 is biased toward bore 43 by a spring (not shown). It will be apparent to those skilled in the art that a variety of types spring biased pin assemblies 48 would be equally effective and would not depart from the spirit and scope of the invention.

Folding A-frames 16 may each include one or more sets of joints 38. Joints 38 may be staggered in location such that folded A-frames 16 achieve an orientation generally parallel to platform 20 when folded. It is preferable that folding A-frames 16 located at the ends of base 12 fold inwardly (that is, toward each other) for stacking. A third or additional interior folding A-frame 16 includes more than one set of joints 38. Such an A-frame includes two or more, e.g., upper and lower hinged-together portions, the lower portion also being hinged at or near the base so that after the upper and lower portions are folded together, the folded portions themselves can be folded generally parallel to the base 12.

Folding A-frames 16 also support resilient cushioning 36 on the outside edges 57 thereof. Cushioning 36 utilized on the supports may also be joined to the A-frame's 16 outer edges. Again, examples of cushioning materials which may be utilized on the A-frame 16 include, but are not limited to, Neoprene™, Santoprene™, or other similar cushioning materials.

Load securing assemblies 18 includes strap 58, upper securing device 60, and lower securing device 62. The upper end 64 of strap 58 is secured to upper securing device 60. The lower end 66 of strap 58 is removably secured by a fastener 67 to lower securing device 62. The fastener 67 may include, but is not limited to, a hook, clamp, or other similar fastening devices.

In one embodiment, lower securing device 62 comprises a housing 68 that includes ramped slots 70. A traveler 72 is slidably retained in ramped slots 70. The traveler 72 may be a fastener such as a bolt, rivet or pin. The strap 58 further includes a tensioner 74. Tensioner 74 may include any device for selectively applying tension to strap 58. Tensioner 74 may include a ratchet winding device, an over center device or the like. The strap 58 may be constructed of any material that is of suitable strength and resiliency of sufficient dimensions to secure a load. Examples of such materials include nylon, polyester and Kevlar®.

In operation, the folding transport rack 10 may be placed near the end of a float glass production line. Glass sheets, upon leaving the end of the production line, are turned on edge, stacked on top of the material supports 14 and leaned against folding A-frames 16 as depicted in FIG. 6. When one side of the folding glass transport rack 10 is full, the folding glass sheet rack 10 may be turned 180° in order to load the other side.

The folding glass sheet rack 10 may be transported by a forklift (not shown) or by a towed low dolly jack (not shown). Forklift pockets 32 facilitate transport by a forklift. A low dolly jack (not shown) may be inserted into corridor 24 where its jacks may be activated to lift the folding glass transport rack 10. Any suitable motorized unit, such as a forklift, may tow the low dolly jack, or the dolly jack may contain its own motive power.

Load securing assemblies 18 may be applied to secure glass panels in place on the folding glass transport rack 10 for transport. In one embodiment depicted in FIG. 6, straps 58 are applied by stretching them downward from upper securing device 60 over the objects 11 to be loaded and securing lower end 66 of strap 58 to traveler 72 with fastener 67. Tensioner 74 is then tightened. As strap 58 is tightened, traveler 72 moves upwardly and inwardly in ramped slot 70 urging objects 11 toward A-frames 16. When released, traveler 72 moves downward and outward by gravity to be in its most accessible position for future use.

A loaded and secured folding glass transport rack 10 may be transported by truck or in a railroad car or by other suitable means. The low lift height afforded by supports 14 allows for "free fall" unloading directly from the folding glass transport rack 10 if desired. In "free fall" unloading individual glass sheets are tipped from a vertical position to a horizontal position and cushioned from damage by air trapped beneath them as they fall.

Once the end customer has removed the load, the foldable transport rack 10 may be folded for compact storage and return shipping. Folding may be accomplished by a single worker by first releasing pin assembly 43 from the bore assembly 44 of the inner A-frames 16. It is preferred to start at the highest of joints 38 and work downward. Inner A-frames 16 may then be folded to lie generally parallel to platform 20. The end folding A-frames 16 may then be released by removing pin assembly 43 from bore assembly 44 and then folding end A-frames 16 inwardly. It is noted that all folded A-frames 16 remain secured to the platform of the foldable transport rack, and it should also be appreciated that each rack can easily be folded and unfolded by a single individual.

Figure 7:
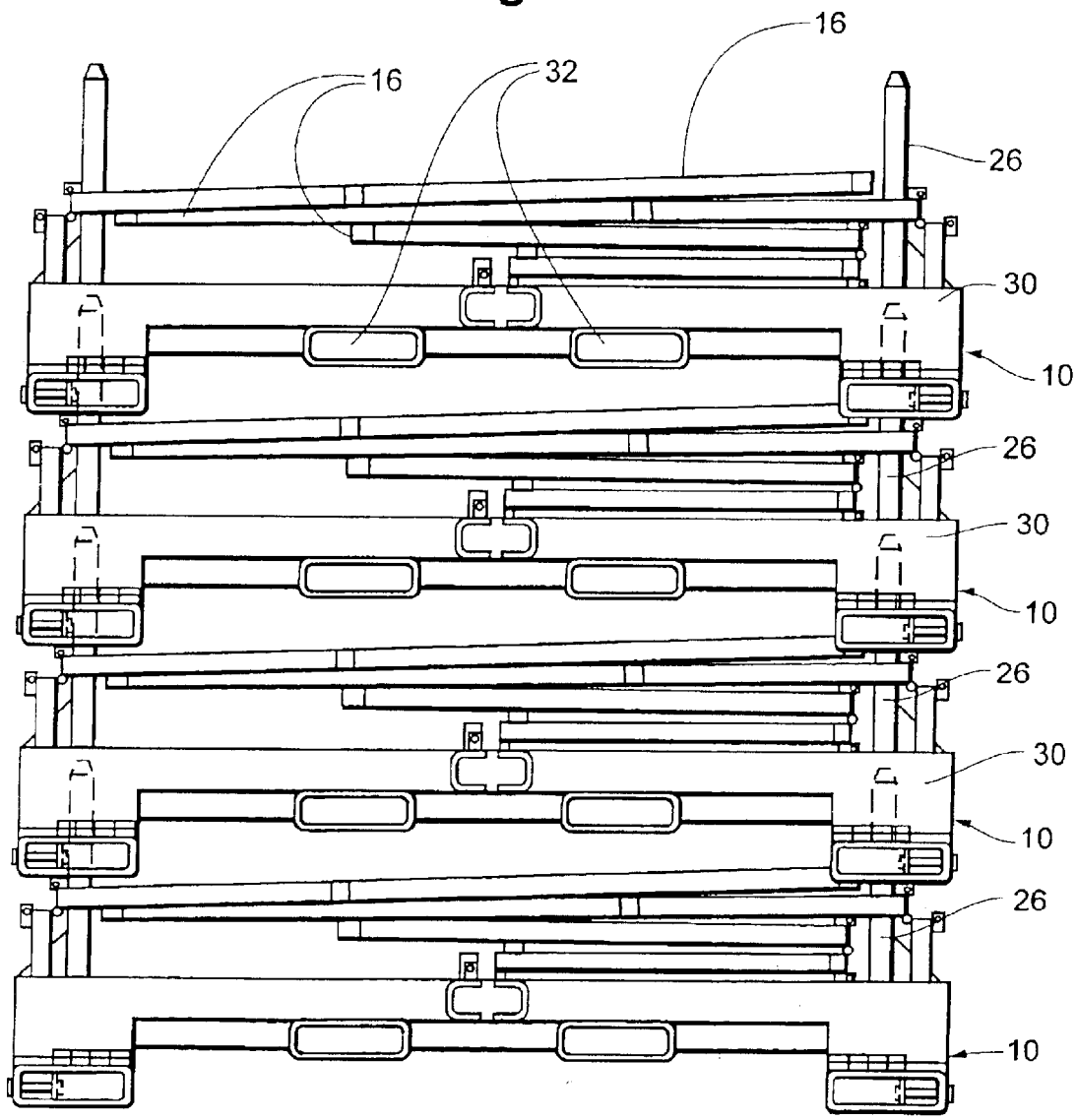
FIG. 7 is a front elevational view of four transport racks of the present invention in a folded configuration stacked for empty shipping.

As depicted in FIG. 7, once the folding operation has been completed, foldable transport racks 10 may be stacked, by an ordinary forklift, for compact storage and economical return shipping. As can be seen in the embodiment depicted in FIG. 7, the stacking posts 26 fit securely within the stacking pockets. Such interaction between the individual foldable transport racks 10 aids in the optimizing of transport space and also retention and securing of the stacked racks 10.

For ease of loading and unloading, and to obtain good stability and maximum capacity, it is preferable that the glass sheets be carried as low as possible, and this feature is afforded by the Rack of the invention. A lower loading height allows the transport of larger sheets of glass under a given ceiling height. Furthermore, the lower loading height assists in the prevention of breakage. By utilizing the rack of the invention, it becomes possible to collect the glass at the end of the float glass line directly onto the A-frame rack which, with its load of glass, is then transported to storage and thence from storage is transported to customers or to other locations for further manufacturing steps, such as coating. Such an alternative would provide for removal from the rack only upon arrival to the customer or location for further manufacturing, thereby minimizing handling and consequent risk of breakage. The empty A-frame rack is then returned to the float glass plant for reuse.

The present invention may be embodied in other specific forms without departing from the essential attributes thereof. Therefore, the illustrated embodiments should be considered in all respects as illustrative and not restrictive, reference being made to the appended claims rather than to the foregoing description to indicate the scope of the invention.

What is claimed is:

1. A transport rack for storing and transporting objects comprising:
    a horizontal base;
    one or more supports having a portion extending outwardly from the base; and
    one or more A-frame members joined to said base, said A-frame members having hingedly joined upper and lower portions and wherein one or more A-frame members is hingedly foldable to a folded orientation substantially parallel to said base.

2. The transport rack of claim 1, further comprising legs joined to said frame and wherein said one or more supports are joined to and extend outwardly from said legs.

3. The transport rack of claim 1, wherein said base and legs define a corridor into which a dollyjack is receivable.

4. The transport rack of claim 1, wherein said base further comprises a plurality of fork lift pockets.

5. The transport rack of claim 1, wherein said base further comprises one or more stacking assemblies enabling the transport rack and other, identical transport racks, when folded, to be stacked upon one another.

6. The transport rack of claim 5, wherein the stacking assemblies include stacking posts and stacking pockets borne by the base, the posts being receivable in the stacking pockets.

7. The transport rack of claim 1, wherein said one or more supports have bottom surfaces adapted to support the rack upon a floor, and wherein said supports are dimensioned to support objects at less than about twelve inches above the floor.

8. The transport rack of claim 7, wherein one or more supports are adapted to support objects at a height of about three inches above the floor.

9. The transport rack of claim 1, where in said rack is constructed such that folding and unfolding of the one or more A-frames is accomplished without removal of any part.

10. A transport rack for storing and transporting panel-like objects such as glass sheets, the rack comprising a generally horizontal base, at least one support having a portion extending outwardly from the base, and at least one A-frame member joined to said base and having a surface against which said panels may rest, the transport rack further comprising at least one load securing assembly for securing said objects, said load securing assembly comprising a strap having a first end and a second end, said first end being secured to said A-frame member, said second end being removably, slidably attachable to said support such that when said strap is tensioned, said second end is slidably biased toward said A-frame member.

11. The transport rack of claim 10, wherein said support includes a ramped slot, the load securing assembly including a traveler slidably retained in said ramped slot and to which the second end of said strap is attached.

12. The transport rack of claim 11, wherein the ramped slot is sloped upwardly and inwardly toward said A-frame member.

13. A transport rack for storing and transporting sheet objects, said objects having a lower edge and a generally planar surface, the rack comprising:

a base having floor-engaging legs;

one or more support members proximate the floor and extending outwardly, away from said base, for supporting said lower edges; and one or more A-frame members hingedly attached to said base and having a surface for supporting said planar surface in a leaning orientation, said A-frame members being foldable from a generally A-shaped upright orientation to a generally horizontal orientation while remaining attached to said base, and further having hingedly adjoined upper and lower portions enabling said portions to be folded.

14. The transport rack of claim 13, wherein the base and legs define a corridor adapted for removably receiving a dolly jack.

15. The transport rack of claim 13, wherein at least one support member is adapted to carry said lower panel edge twelve inches or less from said floor.

16. The transport rack of claim 13, wherein said rack further comprises stacking assemblies enabling a plurality of such racks to be stacked upon one another in a space-efficient configuration.

17. The transport rack of claim 13, said rack comprising two spaced apart end A-frame members each hingedly connected to said base so as to be foldable inwardly toward the center of said base, and at least one interior A-frame member hingedly connected to said base between said end A-frame members and hingedly divided into two or more portions so foldable with respect to each other that the two or more portions each, when folded, are generally parallel to said base.

18. A transport rack for storing and transporting panel-like objects such as glass sheets, comprising:

a generally horizontal base having floor-engaging legs;

at least one support proximate the floor and extending outwardly from at least one of said legs for supporting said objects;

at least one A-frame member hingedly joined to and extending upwardly from said base, said A-frame member having a supporting surface against which said objects may lean; and a strapping system for securing said objects, said strapping system comprising one or more straps each having a first end and a second end, said first end being secured to said A-frame member, and a traveler adapted for removable coupling to said second strap end, said traveler being slidably retained in said support such that tensioning of said strap causes said slider to travel inwardly toward said A-frame member whereby said objects are securely held.

19. The transport rack of claim 18, in which one or more of said A-frame members is divided into two or more portions coupled by hinges such that said portions may be folded into an orientation generally parallel to said base.

20. A method for storing and transporting panel-like objects comprising the steps of:

providing a rack, said rack comprising:
a base, at least one support proximate a floor on which the rack may rest,
the support extending outwardly away from said base, and at one or more A-frame member hingedly attached to said base, said A-frame members being foldable from a generally upright orientation to a generally horizontal orientation while remaining attached to said base;

at a first location, loading said panel-like objects one at a time onto said support, said objects being positioned parallel to each other to form a stack that leans against said A-frame members;

without removing said panels in stack form from the rack, transporting said rack containing the stack of panels to one or more different locations, ending at a final location at which said panels are unloaded from the rack one at a time.

21. The method of claim 20 wherein said panels are glass sheets, and said first location is adjacent a float glass line to receive glass panes one at a time from the float glass line.

22. The method of claim 21 wherein said final location is adjacent a glass coating line to deliver glass sheets one at a time to the coating line.

23. The method as claimed in claim 20, further comprising securing the panel stack to the rack with a load securing assembly comprising at least one strap having a first end and a second end, said first end being secured to said A-frame member, said second end being removably, slidably attachable to said support member, and tensioning the strap so as to slidably bias the second end of the strap toward said A-frame member.

24. The method as claimed in claim 20, further comprising the step, after unloading the panels one at a time from the rack, of folding said hinged joints so that said one or more A-frames lie generally parallel to said base, and stacking said rack with other similar racks for compact storage and transport.

* * * * *